United States Patent [19]
Machida

[11] Patent Number: 5,555,064
[45] Date of Patent: Sep. 10, 1996

[54] MODE CHANGEOVER DEVICE

[75] Inventor: Katsuki Machida, Tokyo, Japan

[73] Assignee: Asahi Kogaku Kogyo Kabushiki Kaisha, Tokyo, Japan

[21] Appl. No.: 426,579

[22] Filed: Apr. 21, 1995

[30] Foreign Application Priority Data

Apr. 28, 1994 [JP] Japan ................................ 6-092185

[51] Int. Cl.⁶ ................................................. G03B 17/18
[52] U.S. Cl. ................................. 354/289.12; 354/475
[58] Field of Search .................................. 354/442, 465, 354/471, 474, 475, 289.1, 289.11, 289.12

[56] References Cited

U.S. PATENT DOCUMENTS

| | | | |
|---|---|---|---|
| 4,717,936 | 1/1988 | Shimizu et al | 354/471 |
| 4,788,569 | 11/1988 | Yamada et al. | 354/474 |
| 5,142,320 | 8/1992 | Nakano et al. | |
| 5,191,373 | 3/1993 | Nakano . | |
| 5,298,936 | 3/1994 | Akitake et al. | 354/471 |
| 5,363,169 | 11/1994 | Ishida | 354/289.1 |

*Primary Examiner*—A. A. Mathews
*Attorney, Agent, or Firm*—Greenblum & Bernstein P.L.C.

[57] ABSTRACT

A camera has a mode changeover device which covers parts of a mode display device while revealing others when a photographing mode is selected by the operator. One of a masking member or the mode display device moves relative to the other when a selection switch is operated, thus revealing a portion of the mode display device corresponding to the selected mode. Furthermore, each revealable portion of the mode display device has displayable submode indicators, allowing the operator to reveal and obscure entire groups of selectable submodes.

21 Claims, 14 Drawing Sheets

MODE CHANGEOVER DEVICE

BACKGROUND OF THE INVENTION

The present invention relates to devices for switching a photographing mode of a camera having several photographing modes.

Conventional cameras may have a plurality of photographing modes selectable by a photographer. For example, known modes include a program auto-exposure (AE) mode, which automatically determines both exposure and aperture; a shutter-priority AE mode; an aperture-priority AE mode; a manual exposure mode; and a bulb mode. Recently, modern cameras are also equipped with specialty program modes designed for specific photographing conditions. For example, known specialty program modes include: "portrait" mode, optimized for photographing clear portraits and having an easily controllable depth of field; a "landscape" mode, optimized for photographing scenery and having a large depth of field; "action" mode, optimized for moving objects and having a fast shutter speed; and a "close-up" mode, optimized for up close photography and which focuse evenly at small distances between the camera and the object to be photographed.

Conventionally, by operating manual selector switches provided on the camera, the mode and/or specialty mode is selected by an operator and displayed on a display panel (for example, an LCD panel) provided on the camera body. However, a drawback of the prior art cameras, is that as additional modes, sub-modes, and specialty program modes are displayed, the number of LCD segments required in a display multiplies. As such, the LCD panels are large and expensive. Generally, there is a relationship between the number of segments and cost, as each segment is controlled individually. Further, when some of the segments are ON, but most of the remaining segments are OFF, as the non-displaying segments become a larger proportion of the total number of segments, the displayed information becomes difficult for an operator to interpret, and the non-active area of the display is wasted.

SUMMARY OF THE INVENTION

It is therefore an object of the present invention to provide an improved mode changeover device capable of decreasing the number of segments on a displaying device. A further object is to make the information displayed on the displaying device easily interpretable by a user.

These objects are achieved by the invention by providing a photographing mode changeover device for a camera including a mechanism for selecting one of a plurality of photographing modes. A display device with a mode display portion for displaying the photographing mode selected by the selecting mechanism and a masking member with a masking portion for covering one mode display portion and a window portion for revealing is provided. A device for moving one of the masking member or the display device with respect to the other, in response to the selecting mechanism is also provided. When the window portion reveals the selected mode display portion of the display device, the masking portion simultaneously covers a remaining mode display portion of the display device. In this manner, the changeover device may be switched between at least two modes, one mode being obscured when the other is revealed, thus simplifying the display and the control of the display. The masking member preferably includes an opaque masking portion and a transparent window portion which is smaller than a total display area of the display device. As the masking member only reveals selected segments when a mode is selected, the number of segments controlled at any given time is reduced, and each controlled segment may be split between portions of the display that are mutually exclusive. Furthermore, the reduction of the number of segments visible reduces the available information content of the display, making the display easily interpretable.

According to a feature of the present invention, each of the plurality of photographing modes includes a plurality of submodes. The camera also includes mechanism for choosing one of the plurality of submodes. In this case, information corresponding to any of the plurality of submodes of a selected photographing mode is displayed when the mode display portion is revealed. For example, the mechanism for choosing includes a switch for selecting and displaying information corresponding to the submode chosen in the revealed mode display portion of the display device. In this manner, the user can select a mode group while obscuring an unselected mode group, and then select among submodes in the mode group.

According to yet another feature of the present invention, the selecting mechanism also includes a sliding member slidable to select one of the plurality of photographing modes. In one variation of this feature, the sliding member is associated with the masking member, and the masking member moves responsive to movement of the sliding member. In this case, the camera may include a transparent cover, and the window portion is slidable between the transparent cover and the display device. Alternatively, the masking member can be integrally formed with the sliding member. In another variation of this feature, the sliding member is associated with the display device, and the display device is moved in response to sliding of the sliding member. The sliding member provides a convenient, and simple way of obscuring one portion of the display device while revealing another simultaneously.

According to still another aspect of the present invention, the mode selecting mechanism acting as a power switch, and the mode selecting mechanism can turn the camera ON and OFF. In this case, the mode selecting mechanism includes a three position switch, switchable between a first mode position, a second mode position, and an OFF position. This feature of the invention may use a masking member with opaque and window portions as other aspects of the invention.

DESCRIPTION OF THE ACCOMPANYING DRAWINGS

DESCRIPTION OF THE EMBODIMENTS

Hereinafter, the invention is described with reference to the accompanying drawings.

Figure 1:
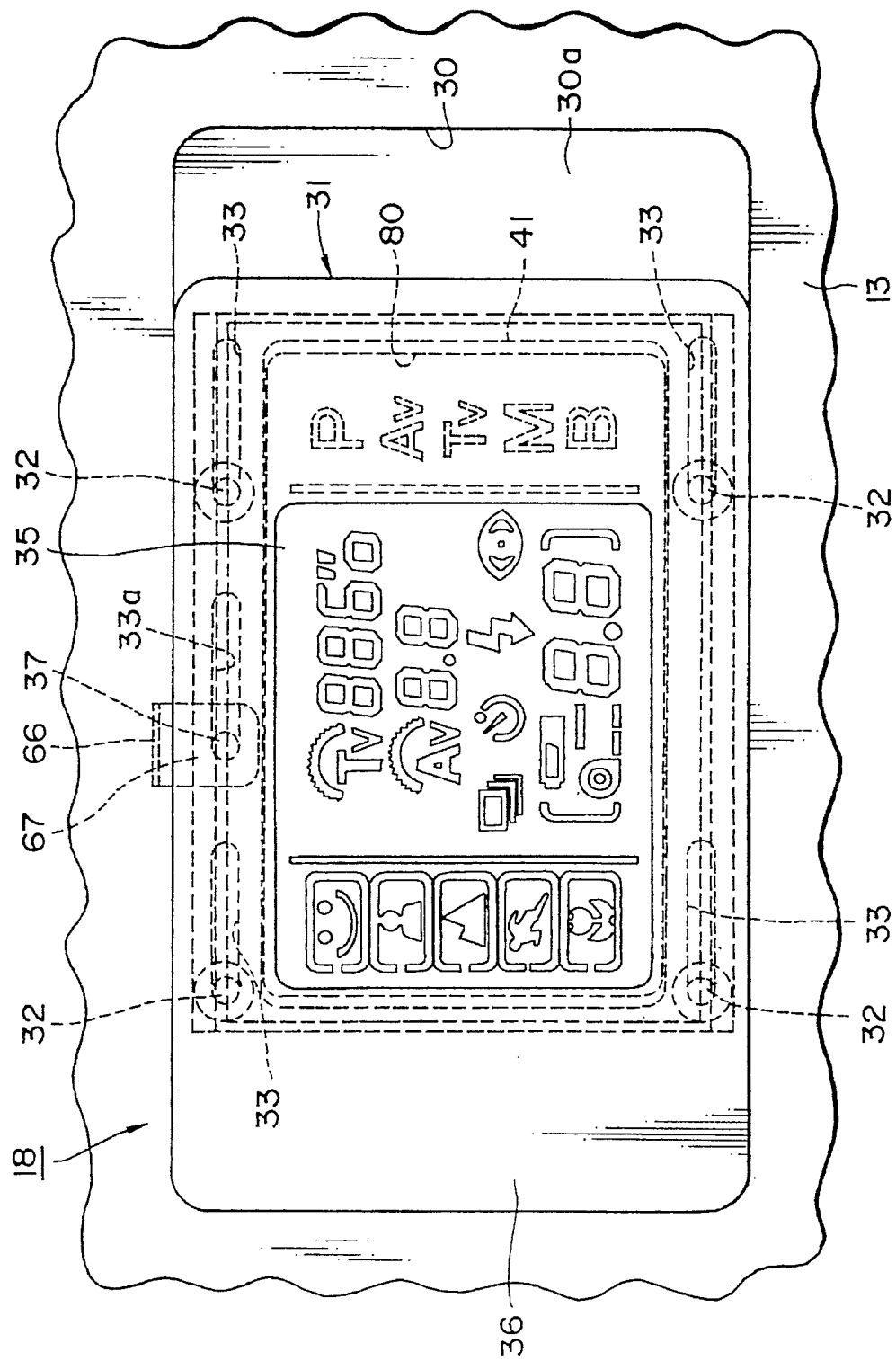
FIG. 1 is a plan view of a first embodiment of a mode changeover switch 18 according to the invention.
Figure 2:
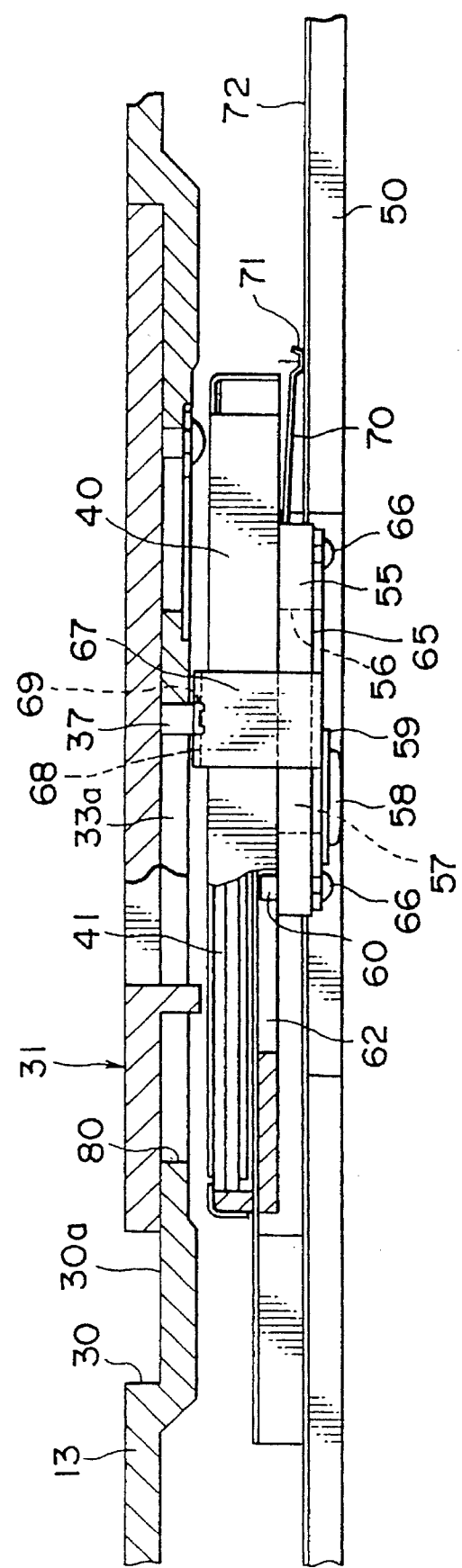
FIG. 2 is a side sectional view of the first embodiment.
Figure 3:
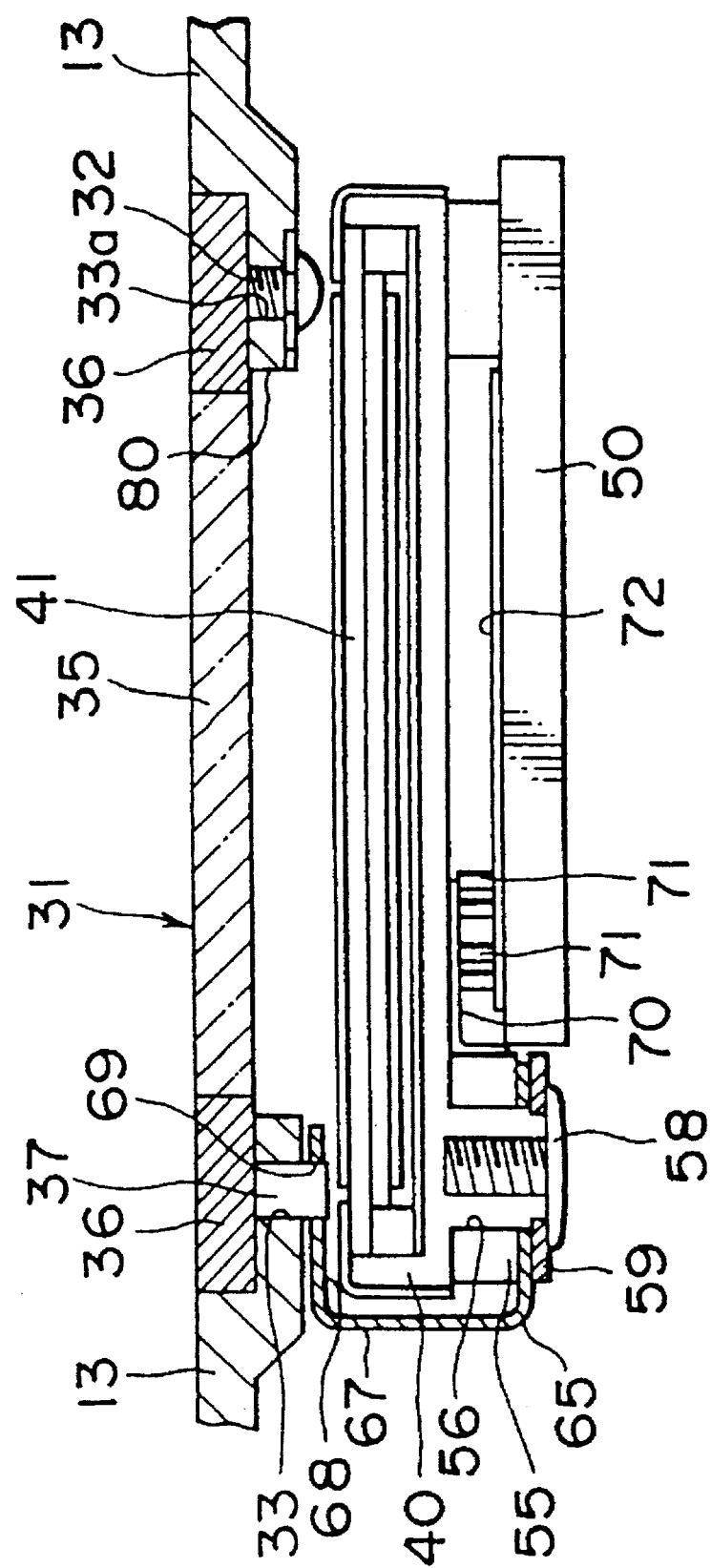
FIG. 3 is a side view of the first embodiment.
Figure 9:
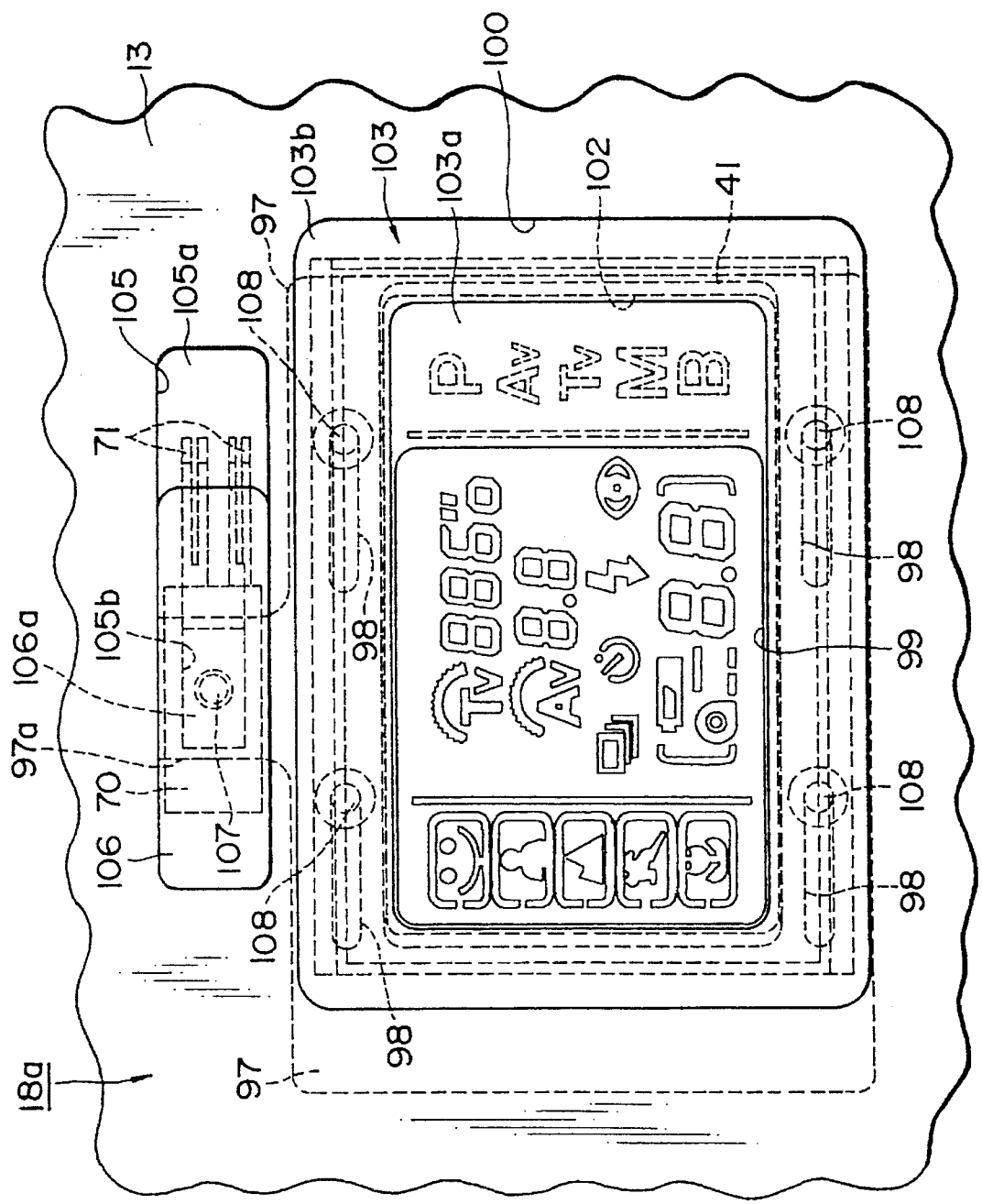
FIG. 9 is a plan view of a second embodiment of a mode changeover switch 18a according to the invention.
Figure 10:
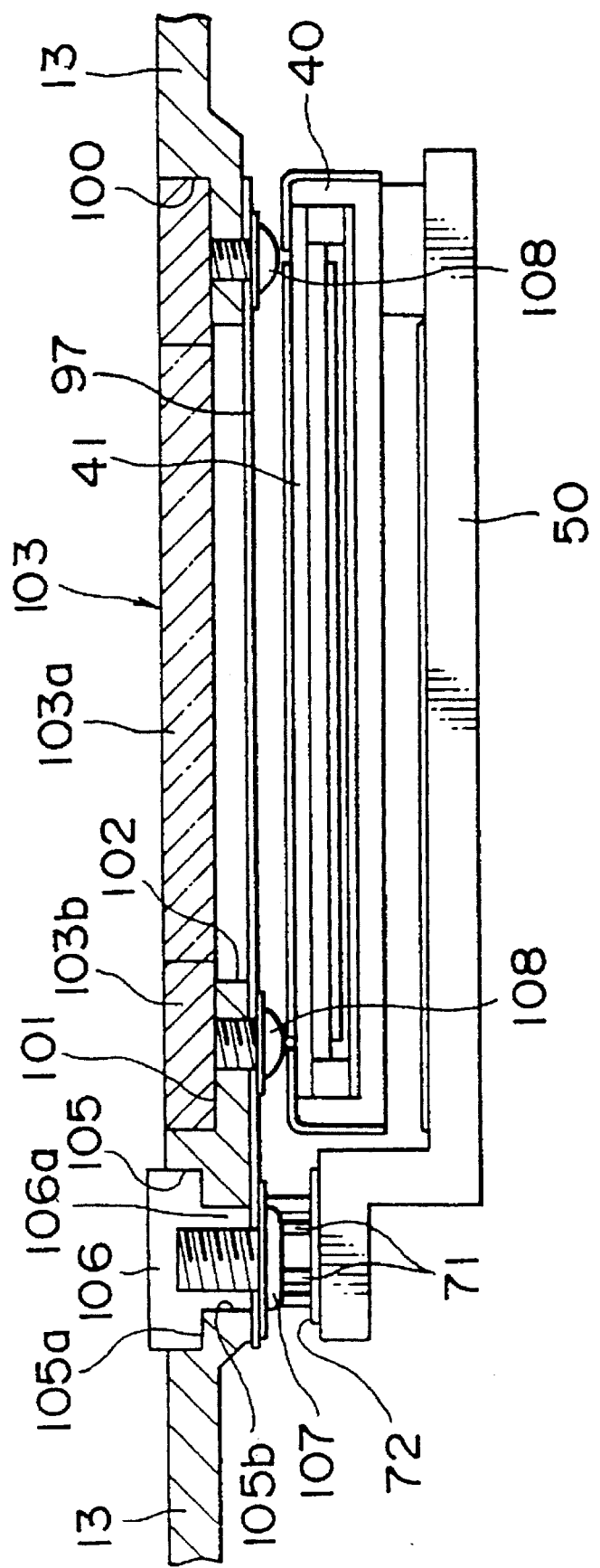
FIG. 10 is a side view of the second embodiment.
Figure 11:
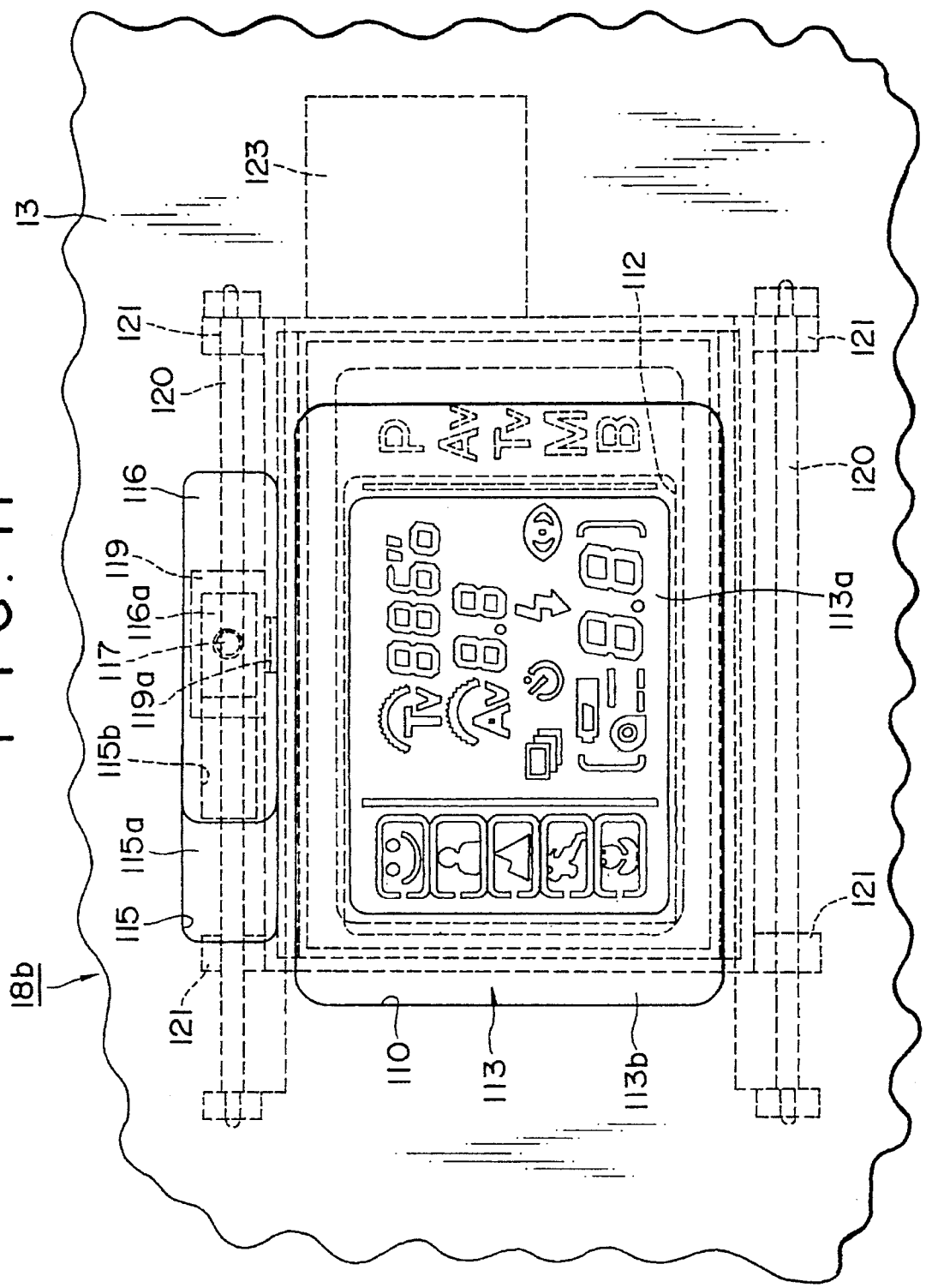
FIG. 11 is a plan view of a third embodiment of a mode changeover switch 18b according to the invention.
Figure 12:
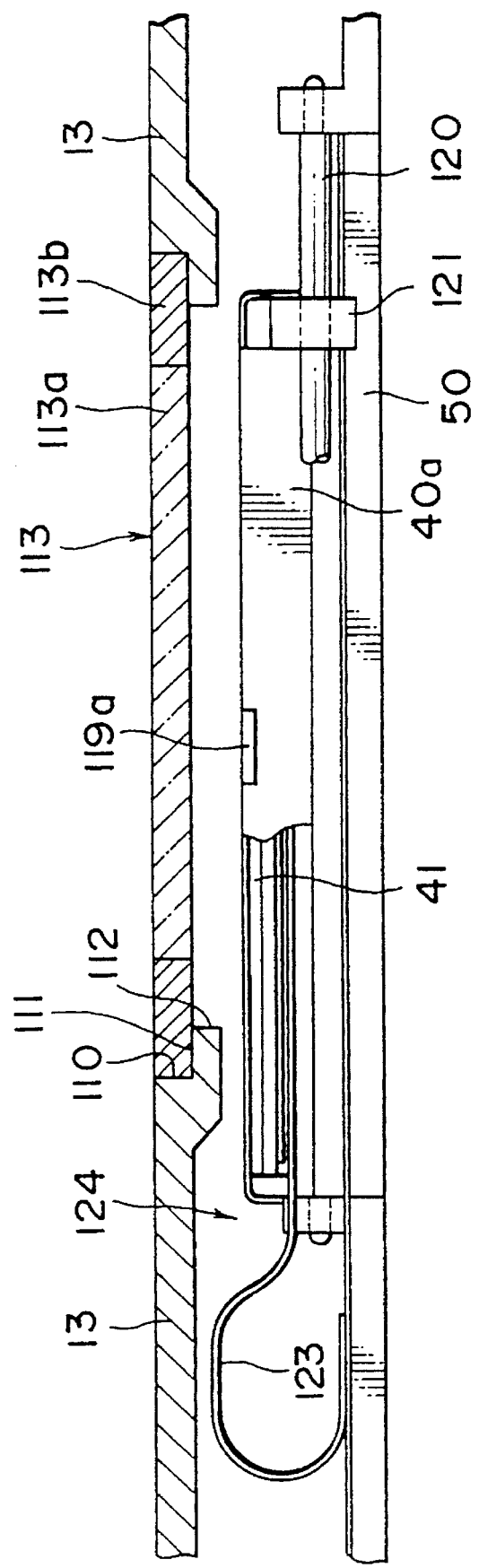
FIG. 12 is a side sectional view of the third embodiment.
Figure 13:
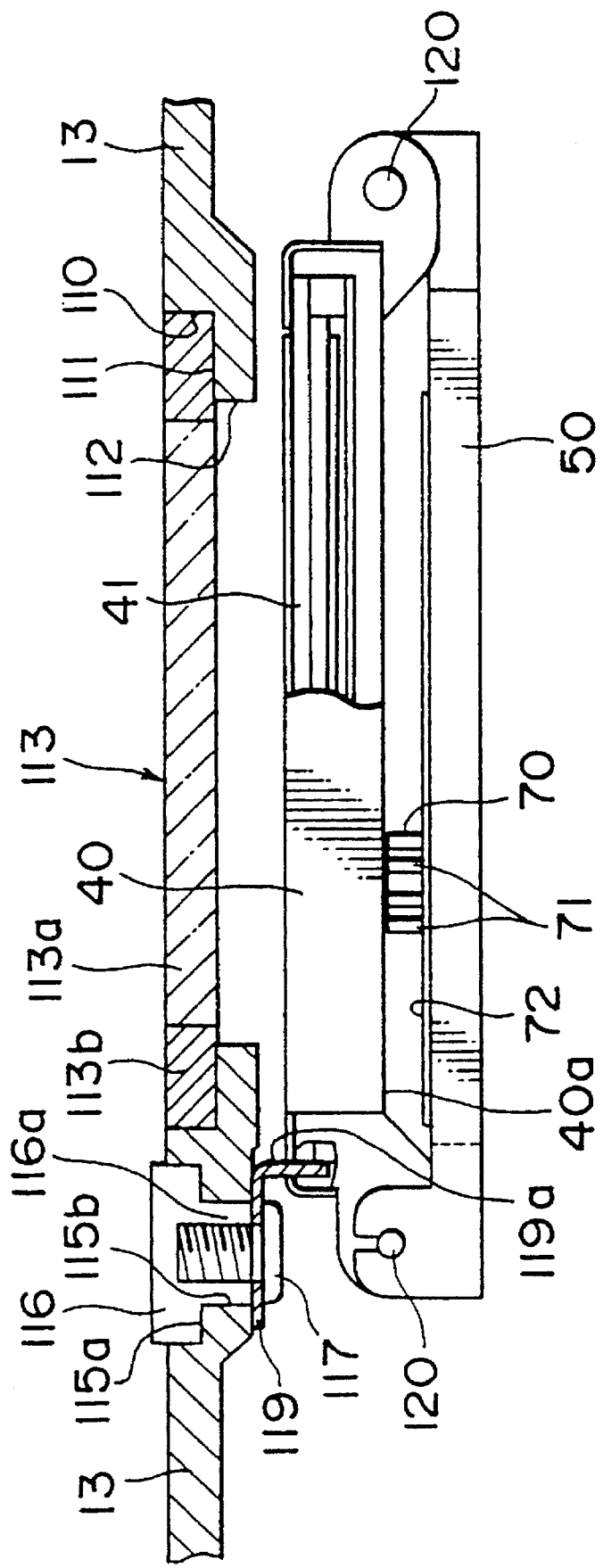
FIG. 13 is a side view of the third embodiment.

FIGS. 1 through 3 show a first embodiment of a mode changeover device. FIGS. 9 through 10 show a second embodiment. FIGS. 11 through 13 show a third embodiment.

Figure 4:
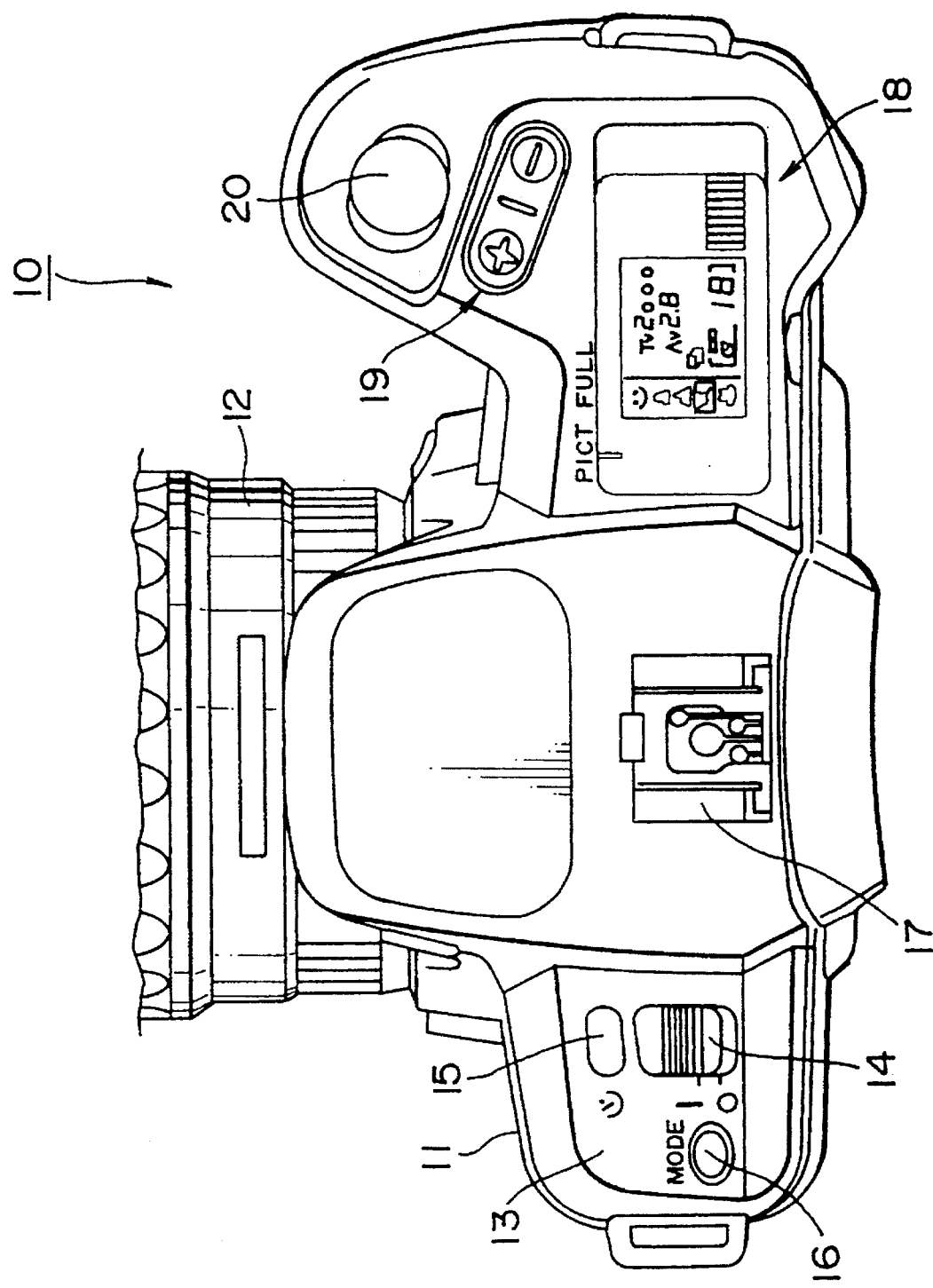
FIG. 4 is a plan view of a camera 10 to which the first embodiment is applied.

Referring now to FIG. 4 a single lens reflex camera, employing a mode changeover device according to the invention is shown. "Front", "back", "left", and "right" as used hereinafter are taken from the orientation of the camera in FIG. 4.

The camera 10 is provided with a photographing lens 12 detachably mounted to the front of a camera body 11. A decorative plate 13 is attached to the camera body 11; and a mode button 16, self-timer button 15 and power switch 14 are recessed in the decorative plate 13. A hot shoe 17 is provided on the top of the camera body 11. A mode changeover switch (incorporating an LCD panel) 18, an up/down rocker switch 19, and a release button 20 are provided at the right side of the camera body 11.

The camera 10 has several photographing modes selectable by the operator. The photographing modes are divided into two groups: a normal mode group and a "picture" (specialty program) mode group. The normal mode group includes: a program auto-exposure (AE) submode, a shutter-priority AE submode, an aperture-priority AE submode, a manual exposure submode, and a bulb submode. The picture mode group includes: a "green" submode, a portrait submode, a landscape submode, an action submode, and a close-up submode. The green submode is a photographing submode for an inexperienced photographer, where the camera automatically chooses an optimum exposure depending on the focal length of the mounted lens 12.

By sliding a sliding member 31 (shown in FIG. 5) of the mode changeover switch 18, one of the normal or picture mode group may be selected by an operator. At this point, with the movement of the sliding member 31, a masking portion 36 of the sliding member 31 is moved across an LCD panel 41 (shown in FIG. 1) such that the a portion of the LCD panel 41 corresponding to the selected mode group becomes visible, while the non-selected mode group is covered. Thus, only the necessary area of the LCD panel 41 is visible to the operator. After the selection of a mode group, one of the photographing submodes of the selected mode group may be selected. The user selects the submode may be achieved by operating the up/down rocker switch 19 while depressing mode button 16.

Referring now to FIG. 1 the first embodiment of the invention is shown. As shown in FIG. 1, the photographing mode switch 18 includes a sliding member 31 which is slidable in left and right word directions by the photographer. The sliding member 31 is fitted into a rectangular guide recess 30 formed in the decorative plate 13. The rectangular guide recess 30 extends from left to right in the decorative plate 13 and includes a bottom surface 30a that is longer than the sliding member 31.

Four round-headed guide pins 32 are attached to the sliding member 31. The heads of the pins 32 engage the sliding member 31 with the groove 33. Two of the guide pins 32, 32 are provided at the front of the sliding member 31, and the remaining two guide pins 32 are provided at the back of the sliding member 31. Each guide pin 32 fits into a corresponding guide groove 33 in the bottom surface 30a of the recess 30, and is slidable along the corresponding guide groove 33. The pins 32 extend from the interior of the camera 10, through the decorative plate 13 (via the grooves 33 formed in the bottom surface 30a) to the sliding member 31. The guide grooves 33, each having a predetermined length, extend laterally along the length of the guide recess 30. The predetermined length of each guide groove 33 corresponds with the sliding range of the sliding member 31 in the guide recess 30. The sliding member 31 is thereby guided by the guide recess 30 and guide pins 32 to slide in the left and right directions.

The sliding member 31 is formed with a transparent window 35 in a central portion thereof, and an opaque mask 36 at the edges. The transparent window 35 is arranged such that the LCD panel 41 is visible through the window 35. The window 35 is smaller than the total display area of the LCD panel 41 to restrict the visible area of the LCD panel 41. Specifically, in the left and right directions, the window 35 is shorter than the total display area of the LCD panel 41, yet of sufficient length to show a main display area 43b and only one of the picture or normal mode display areas 43a or 43b at a time (see FIGS. 7 and 8 for display areas 43a—c).

As shown in FIGS. 2 and 3, the LCD panel 41 is part of an LCD block 40 arranged within the camera body 10 parallel with, and beneath guide groove 30 and sliding member 31. The LCD block 40 is secured to the camera 10 at a fixing plate 50, which is rigidly attached to the camera 10. A piece block 55 is provided at the front of the LCD block 40, and is shiftable in left and right directions in response to the sliding movement of sliding member 31. The piece block 55 includes a guide slot 56 extending from left to right, and a protruding portion 57 of the LCD block 40 fits into the guide slot 56. The piece block 55 has a unitarily formed guide boss 60 slidably fitted into a left to right guide slot 62 formed in the LCD block 40. A screw 58 is threaded to the protruding portion 57, and a washer 59 positioned at the head of the screw 58 retains a two-contact conductive slider 70, a U-shaped coupling plate 65, and the piece block 55 to the LCD block 40. The slider 70 and coupling plate 65 slide together with the piece block 55 (with reference to the protruding portion 57 of the LCD block 40), each having a slot formed therein corresponding to the guide slot 56. A pair of small screws 66, 66 secure the coupling plate 65 and the conductive slider 70 to the piece block 55.

The coupling plate 65 includes an L-shaped arm portion 67 which extends around the LCD block 40, paralleling sliding member 31. An end portion 68 of the arm portion 67 has a hole 69 formed therein, which mates with a drive pin 37 provided on the sliding member 31. The drive pin 37 protrudes towards the inside of the camera 10 from a position approximately midway between the guide pins 32, and extends into the camera 10 through a left to right access groove 33a. The access groove 33a is the same length as the guide grooves 33. When the sliding member 31 is moved left to right or vice versa, the drive pin 37 similarly moves the coupling plate 65, piece block 55, and conductive slider 70 together with the movement of the sliding member 31. Thus, the sliding member 31 is linked to the conductive slider 70, via the coupling plate 65, such that they slide laterally together.

Figure 5:
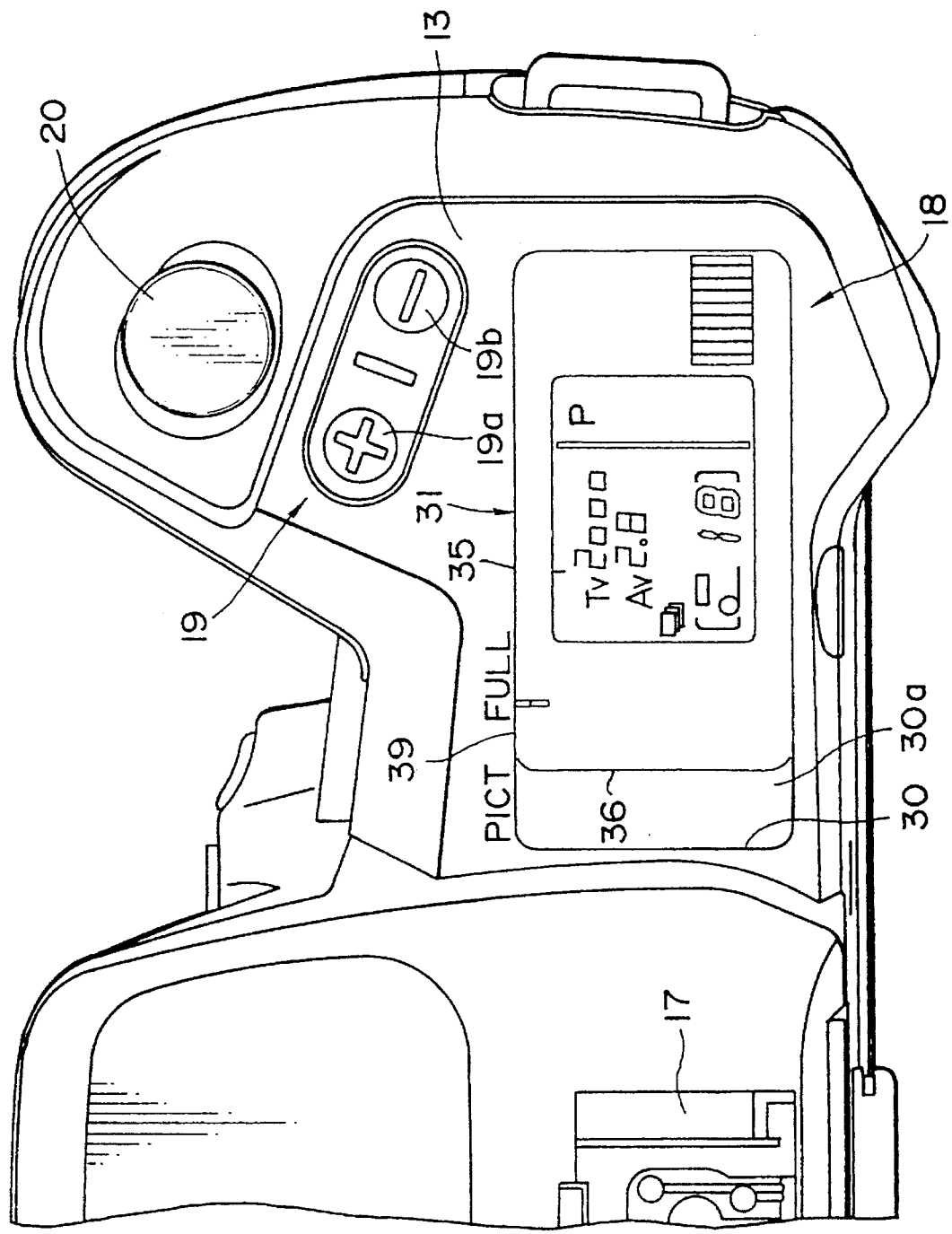
FIG. 5 is an enlarged plan view of the camera 10, showing a first position of the mode changeover switch 18.
Figure 6:
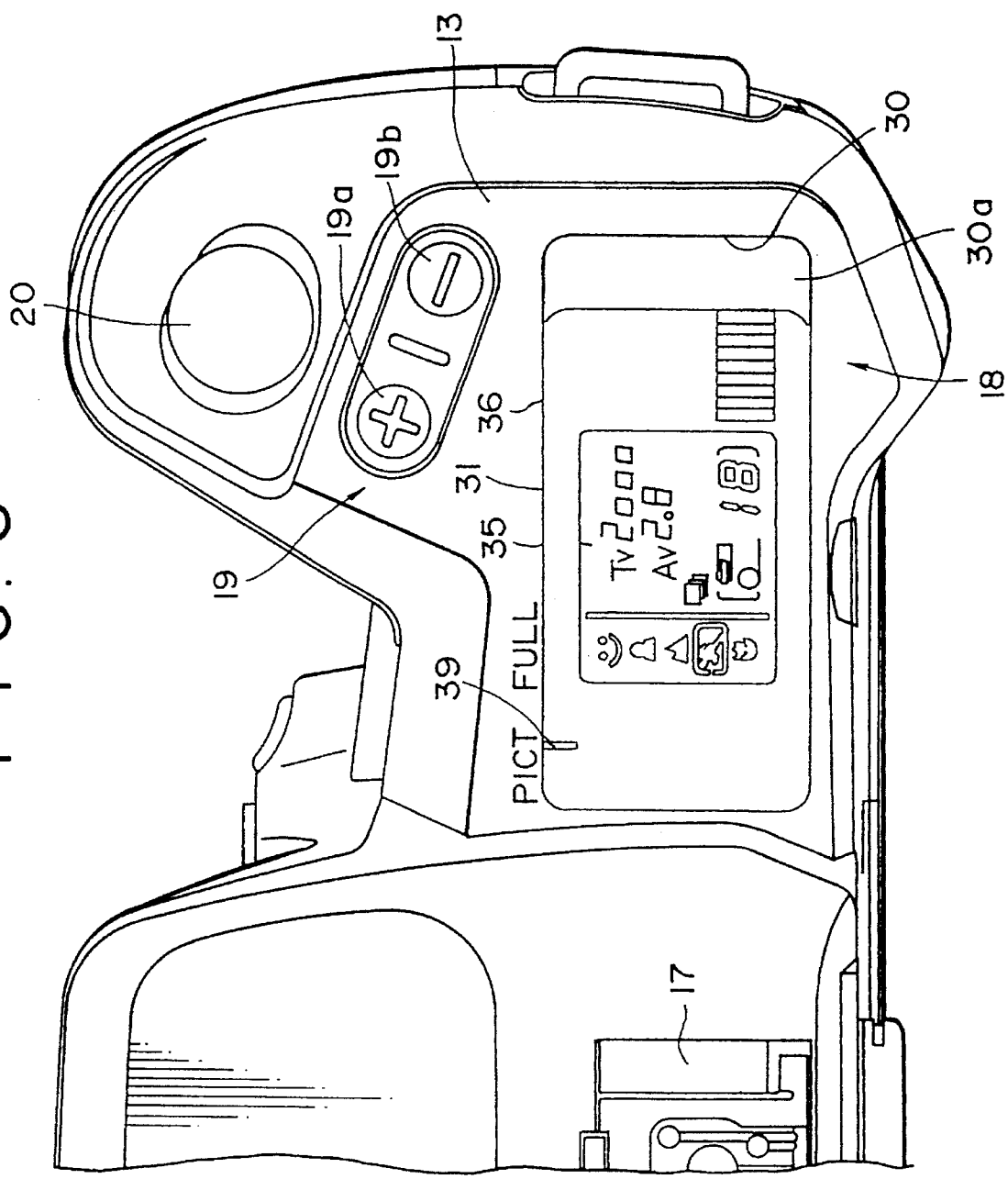
FIG. 6 is an enlarged plan view of the camera 10, showing a second position of the mode changeover switch 18.

The conductive slider 70 includes two slider contacts 71 slidably pressed against a predetermined conductive pattern 72 printed on a flexible circuit board (FCB) provided on the fixing plate 50 in the camera 10. The conductive pattern 72, and slider 70 (linked to the sliding member 31) constitute a mode selection switch. The conductive pattern 72 is connected to a control circuit (not shown), and the control circuit selects one of the above-mentioned mode groups (normal or picture) depending on the contacting condition between the slider contacts 71 and the conductive pattern 72. The control circuit selects the normal mode group when the sliding member 31 is slid to the right of the guide recess 30, as shown in FIG. 5. When the sliding member 31 is slid to the left of guide recess 30, the picture mode group is selected, as illustrated in FIG. 6. When the sliding member 31 moves to the right or leftmost position, a mark 39 on the face of the sliding member 31 matches up with a corresponding "FULL" (normal mode) or "PICT" (picture mode) marking provided on the decorative plate 13.

As shown in FIG. 3, a rectangular opening 80 that opens into the camera 10 is formed in the bottom surface 30a of the slide groove 30. The LCD block 40 is arranged at the rectangular opening 80 to expose the LCD panel 41 through the opening 80.

Figure 7:
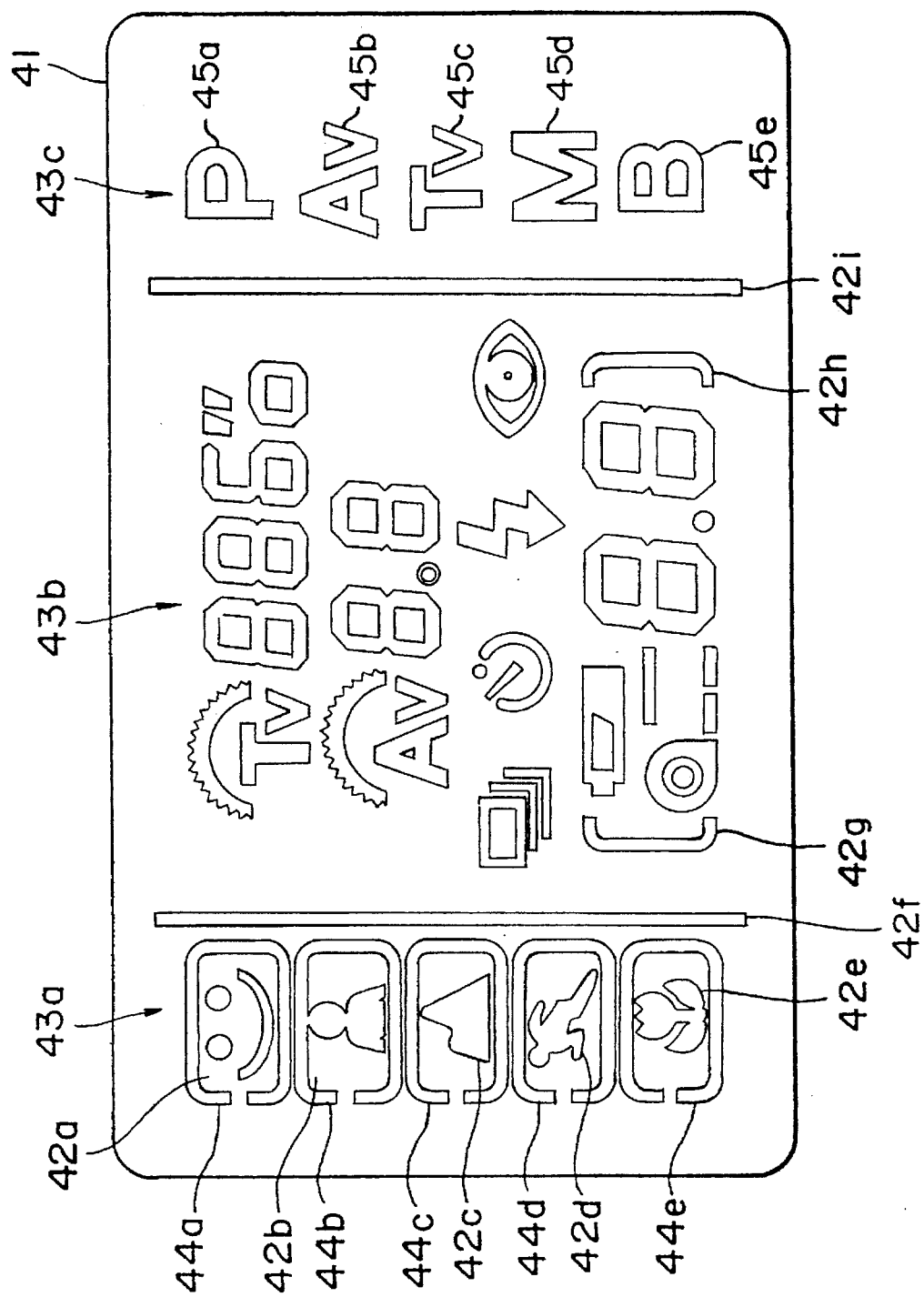
FIG. 7 is a plan view of an LCD panel 41, showing the panel in a fully illuminated condition.
Figure 8:
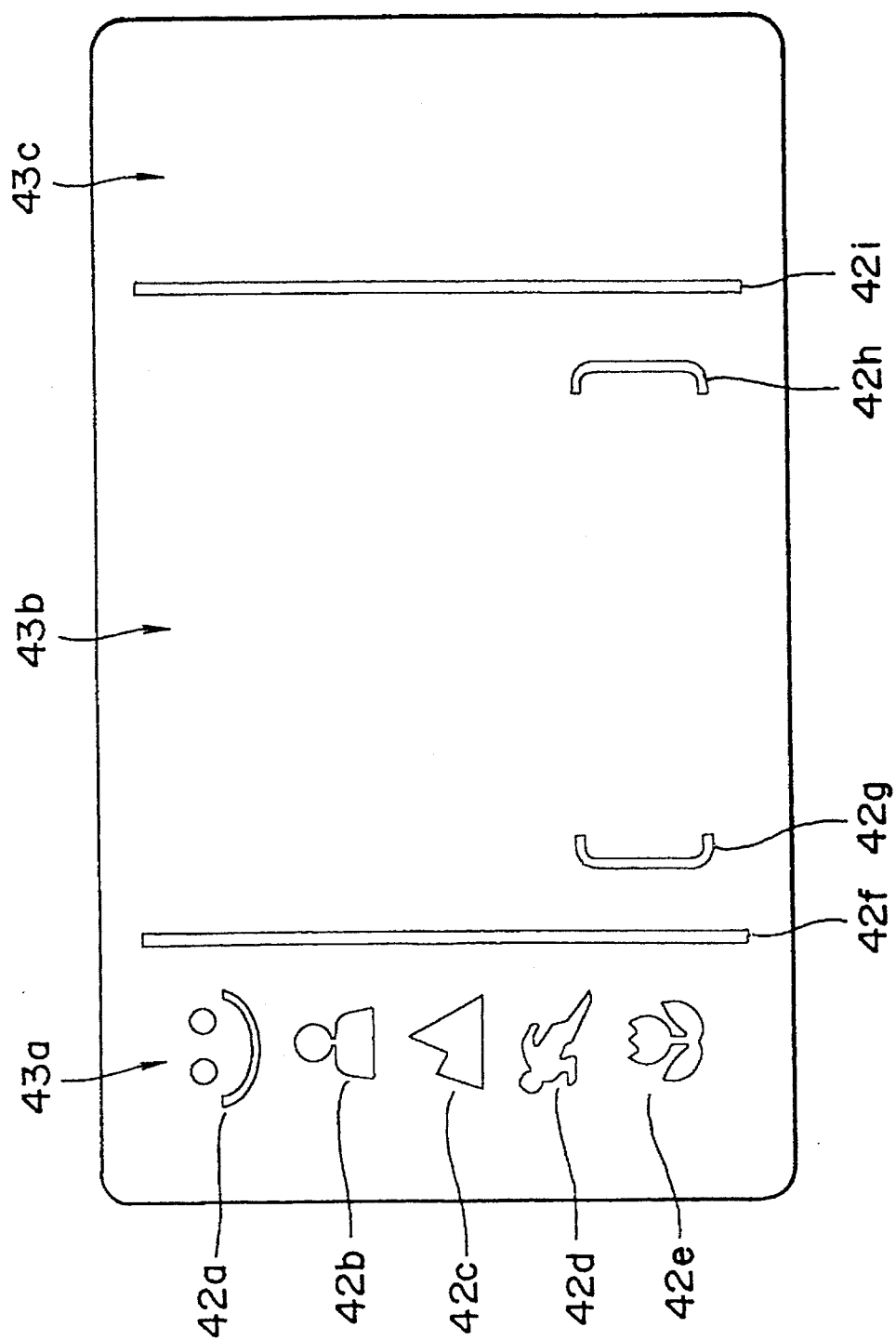
FIG. 8 is a plan view of the LCD panel 41, showing always-ON segments.

The display pattern of the LCD panel 41 is shown in FIGS. 7 and 8. FIG. 7 shows a full illumination condition (all segments activated) of the LCD panel 41. FIG. 8 shows segments 42a through 42i of the LCD panel 41 that are always displayed. These segments 42a through 42i are either printed in the LCD panel and shown whether the camera 10 is ON or OFF, or electrically connected as a single segment and illuminated when the camera is turned ON.

The segments that are always displayed include: pictures 42a through 42e; partition lines 42f and 42i; and left and right square brackets 42g and 42h. Pictures 42a through 42e correspond to the green, portrait, landscape, stop-action, and close-up submodes, respectively, of the picture mode group. Partition line 42f divides a picture mode group display area 43a (including pictures 42a through 42e) from a main display area 43b. Partition line 42: divides a normal mode group display area 43c from the main display area 43b.

As shown in FIG. 7, necessary information for photography such as shutter speed, aperture, single/sequential shot status, self-timer status, strobe status, anti-red-eye function status, and the number of frames, are displayable in the main display area 43b. Information regarding battery charge, film status, and exposure compensation is displayed between the left and right square brackets 42g and 42h. In the normal mode display area 43c, alphabetic character groups represent the normal submodes. If the continuously-displayed segments 42a through 42i of FIG. 8 are omitted from FIG. 7, the remaining segments are those that turn ON and OFF to represent information for the photographer. The normal mode group display area 43c and the picture mode group display area 43a are substantially the same size and shape.

As illustrated the picture mode group area 43a of FIG. 7, frames 44a through 44e surround the pictures 42a through 42e, respectively. When one of the frames 44a through 44e is activated, it indicates that the corresponding surrounded picture is the selected picture mode. In the normal mode group display area 43c, alphabetic characters representing normal submodes are displayed, including: character "P" 45a for full program submode; character "Av" 45b for aperture priority AE submode; character "Tv" 45c for shutter priority AE submode; character "M" 45d for full manual submode; and character "B" 45e for bulb submode. The appropriate character (or characters) 45a through 45e is activated to represent the selected submode from the normal mode group.

When the sliding member 31 is slid to the right side to choose the normal mode group as illustrated in FIG. 5, the transparent window 35 is positioned in front of the LCD panel 41 to show only the main display area 43b and the normal mode group display area 43c, while the mask portion 36 covers the picture mode group display group 43a. Conversely, when the sliding member 31 is slid to the left side to choose the picture mode group as illustrated in FIG. 6, the transparent window 35 is positioned in front of the LCD panel 41 to show only the main display area 43a and the picture mode group display area 43a, while the mask portion 36 covers the normal mode group display group 43c. When taking a photograph, the power switch 14 is first turned ON. Thereafter, the photographer operates the mode changeover device 18 to choose eight of the picture mode or normal mode group. To select the normal mode group, the sliding member 31 is slid left until the indication mark 39 coincides with the marking "FULL" on the decorative plate 13. The main display area 43b is always visible. At this point, the normal mode group display area 43c becomes visible, while the picture mode display area 43a is covered. The photographer then selects one of the normal mode group submodes by depressing the up/down rocker switch 19 on the up portion 19a or down portion 19b, while continuously depressing the mode button 16. Each time the up button 19a or down button 19b is depressed, the active character of characters 45a through 45e change in turn, cycling in opposite directions through the characters 45a through 45e (corresponding to the direction, up or down, as chosen). FIG. 5 shows the selection of program mode, and the "P" character 45a is therefore shown. Further adjustments to the camera or the taking of a photograph may then be performed. Thus, selection of a normal submode from the normal mode group is accomplished.

To select the picture mode group, the sliding member 31 is slid left until the indication mark 39 coincides with the marking "PICT" on the decorative plate 13, as shown in FIG. 6. At this point, the picture mode group display area 43a becomes visible, while the normal mode display area 43c is covered. The photographer then selects one of the picture mode group submodes by depressing the up/down rocker switch 19 on the up portion 19a or down portion 19b, while continuously depressing the mode button 16. Each time the up button 19a or down button 19b is depressed, the active surrounding frame of frames 44a through 44e cycles up or down, respectively. FIG. 6 shows the selection of stop-action picture submode, where the frame 44d surrounding the stop-action symbol 42d is activated. Further adjustments to the camera or taking of a photograph may then be performed. Thus, the selection of a picture submode from the picture mode group is accomplished.

A further improvement of the above uses an LCD 42 having pairs of visible segments (in the two display areas 43a and 43c) on the same vertical level connected together electrically. That is, picture frame 44a and character "P" 45a are connected together, picture frame 44b and character "Av" 45b are connected together, and so on, through frame 44e and character 45e. For example, when the normal mode selection is made and the sliding member 31 is slid to the left, if program submode is selected with the rocker switch 19 and the "P" character 45a consequently activated, frame 44a is simultaneously activated, and vice versa. However, since the mask portion 36 covers the picture mode group display area 43a, the activated frame 44a is not visible to the photographer. As the photographer cycles through the normal submodes and corresponding characters 45a through 45e using the rocker switch 19, the frame segments 44a through 44e are also activated, but remain hidden. The operation is symmetrically identical when the picture mode group is selected and the normal mode group display area 43c is hidden.

Second Embodiment

FIGS. 9 and 10 illustrate a second embodiment of a mode changeover device 18a according to the invention. By sliding a sliding member 106 of the mode changeover device 18a of the second embodiment, one of a normal mode group or a picture mode group is selectable. Furthermore, in response to the movement of sliding member 106, a mask plate 97 covers and hides the non-selected mode group area of the LCD panel 41.

Elements of the second embodiment that are identical to those of the first embodiment are designated by the same reference numerals in FIGS. 9 and 10, and description of those elements is hereinafter omitted.

A recessed portion 100 is formed behind the up/down rocker switch 19 in the decorative plate 13. An opening 102 having an area corresponding to the total display area of the LCD panel 41 is formed in the bottom surface 101 of the recessed portion 100. A window member 103 is securely fixed in the recessed portion 100. The window member 103 includes a transparent window portion 103a substantially the same size as the opening 102, and an opaque portion 103b surrounding the transparent window portion 103a. As in the first embodiment, the LCD block 40 is fixedly attached to a fixing plate 50 in the camera body 10, and the LCD panel 41 is arranged to face the transparent window portion 103a and opening 102. The transparent window 103a is aligned with the opening 102 and the display area of the LCD panel 41. The dimensions of the transparent area 103a, opening 102, and the total displayable area of the LCD panel 41 are substantially the same.

The upper decorative plate 13 has a guide recess 105 extending from left to right in front of the window member 103. A sliding member 106 is slidably fit into the guide recess 105. The bottom surface 105a of the guide recess 105 has a longitudinal guide slot 105b formed therein. The sliding member 106 is provided with a protrusion 106a that extends into the guide slot 105b and is slidable in the guide slot 106a. A screw 107 is threaded into the protruding portion 106a, and affixes a conductive slider 70 and a driving portion 97a (of a mask plate 97) to the sliding member 106. The conductive slider 70 and the mask plate 97 slide laterally with the sliding member 106.

The mask plate 97 is slidably secured to the decorative plate 13 by four round-headed stationary guide pins 108 attached to the decorative plate 13. The stationary guide pins control the movement of the mask plate 97. Two of the guide pins 108, 108 are provided at the front of the window member 103, and the remaining two guide pins 108, 108 are provided at the back of the window member 103. Each guide pin 108 fits into a corresponding guide slot 98 formed through the mask plate 97. The guide slots 98 control the movement of the mask plate 97 in the lateral direction, and the mask plate 97 is slidable with reference to the pins 108. The heads of the pins 108 slidably hold the mask plate 97 against the underside of the decorative plate 13. The pins 108 extend into the interior of the camera 10 from the decorative member 13, having a sliding gap between the heads of the pins 108 and the decorative member 13 for the mask plate 97. The guide slots 98, each having a predetermined length, extend laterally along the length of the mask plate 97. The predetermined length of each guide slot 98 corresponds to the sliding range of the mask plate, and to the sliding length of the sliding member 106 in the guide recess 105. The mask plate 97 is thereby guided by the guide slots 98 and guide pins 108 to be slidable in left and right directions.

The mask plate 97 is formed with a rectangular opening 99 in the central portion thereof, and the remainder of the mask plate 97 is opaque. The rectangular opening 99 is arranged such that the LCD panel 41 is visible through the opening 99, yet is smaller than the total display area of the LCD panel 41 to restrict the visible area of the LCD panel 41. Specifically, in the sliding direction, the rectangular opening 99 is shorter than the total display area of the LCD panel 41, and is of sufficient length to show the main display area 43b and only one of the picture or normal mode display areas 43a or 43b at a time.

As shown in FIGS. 9 and 10, a driving portion 97a of the mask plate 97 has a hole formed therein, and the hole mates with the screw 107 provided on the sliding member 106. The drive portion 97a protrudes towards the sliding member 106 from a position approximately midway between the guide pins 108. When the sliding member 106 is moved left to right or vice versa, the driving portion 97a similarly moves the mask plate 97 and conductive slider 70 together with the movement of the sliding member 106.

The conductive slider 70 is identical to that described for the first embodiment, and includes two slider contacts 71 slidably pressed against a predetermined conductive pattern 72 printed on a flexible circuit board (FCB) attached to the fixing plate 50 in the camera 10. The conductive pattern 72 and slider 70 (linked to the sliding member 106) constitute a mode selection switch, which operates identically to that of the first embodiment. Again, the conductive pattern 72 is connected to a control circuit (not shown), and the control circuit selects the normal mode group when the sliding member 106 is slid to the right of the guide recess 105. When the sliding member 106 is slid to the left of guide recess 105, the picture mode group is selected, as illustrated in FIG. 9. Subsequent selection of a submode from the chosen mode group is identical to the procedure of the first embodiment.

Thus, in the second embodiment of a mode changeover switch 18a according to the invention, the only exposed moving part is the sliding member 106, and the mask member 97 moves within the camera body. The switch 18a uses fewer parts and has few exposed moving parts.

Third Embodiment

FIGS. 11 through 13 illustrate a third embodiment of a mode changeover device 18b according to the invention. By sliding a sliding member 110 of the mode changeover device 18a of the third embodiment, one of a normal mode group or a picture mode group is selectable. Furthermore, in response to the movement of the sliding member 110, an LCD block 40a is slid behind a masking opaque portion 113b of a window member 103, covering and hiding the non-selected mode group area of an LCD panel 41.

Elements of the third embodiment that are identical to those of the first embodiment are designated by the same reference numerals in FIGS. 11 and 12, and description of those elements is hereinafter omitted.

A recessed portion 110 is formed behind the up/down rocker switch 19 in the decorative plate 13. An opening 112 having an area corresponding to a portion of the total display area of the LCD panel 41 is formed in the bottom surface 111 of the recessed portion 110. A window member 113 is securely fixed in the recessed portion 110. The window member 113 includes a transparent window portion 113a substantially the same size as the opening 112, and an opaque portion 113b surrounding the transparent window portion 113a. The LCD block 40a is slidably mounted to a fixing plate in the camera body 10, and the LCD panel 41 is arranged to face the transparent window portion 113a and opening 112. The transparent window 113a is aligned with the opening 112, and the dimensions of the transparent area 113a and the opening 112 are substantially the same.

The upper decorative plate 13 has a guide recess 115 extending from left to right in front of the window member 113. A sliding member 116 is slidably fit into the guide recess 115. The bottom surface 115a of the guide recess 115 has a longitudinal guide slot 115b formed therein. The sliding member 116 is provided with a protrusion 116a that extends into the guide slot 115b and is slidable in the guide slot 116a. A screw 117 is threaded into the protruding portion 116a, and affixes an L-shaped driving arm 119 to the sliding member 106. An arm 119a of the driving arm 119 is fixed to the LCD block 40a.

The LCD block 40a is slidably secured to the fixing plate 50 by four slide bushings 121 attached to the corners of the LCD block 40a. The slide bushings 121 are slidably arranged on two parallel slide rods 120 provided to the fixing plate 50. The slide rods 120 extend in the sliding direction (laterally to the left and right), and are provided with stoppers at the ends to control the range of movement of the LCD block 40a. The slide bushings 121 control the movement of the LCD block 40a. Two of the slide bushings 121, 121 are provided at the front of the LCD block 40a, and the remaining two slide bushings 121, 121 are provided at the back of the LCD block 40a. The slide rods 120 limit the movement of LCD block 40a to the lateral direction. The slide rods 120 are each of a predetermined length which exceeds the length of the LCD block 40a by an amount corresponding the sliding range of the sliding member 116 in the guide recess 115. The LCD block 40a is thus guided by the slide bushings 121 and slide rods 120 to be slidable in left and right directions.

The window member 113 is formed with a rectangular transparent portion 113a in the central portion thereof, and the remainder of the window member 113 is an opaque surrounding portion 113b. The transparent portion 113a is arranged such that the LCD panel 41 is visible through the transparent portion 113a. The transparent portion 113a is smaller than the total display area of the LCD panel 41 to restrict the visible area of the LCD panel 41. Specifically, in the sliding direction, the transparent portion 113a is shorter than the total display area of the LCD panel 41, yet of sufficient length to show the main display area 43b and only one of the picture or normal mode display areas 43a or 43c at a time.

A conductive slider 70 is provided to the bottom of the LCD block 40a, between the LCD block 40a and the fixing plate 50. The conductive slider 70 slids laterally with the LCD block 40a. The conductive slider 70 is identical to that described for the first embodiment, and includes two slider contacts 71 slidably pressed against a predetermined conductive pattern 72 printed on a flexible circuit board (FCB) attached to the fixing plate 50 in the camera 10.

As shown in FIGS. 11 and 13, the L-shaped driving arm 119 (attached to the LCD block 40a via portion 119a) has a hole formed therein, and the hole mates with the screw 117 provided to the sliding member 116. The drive arm 119 protrudes towards the sliding member 116 from a position approximately midway along the LCD block 40a. When the sliding member 116 moves left to right or vice versa, the driving arm 119 similarly moves the LCD block 40a and conductive slider 70 together with the movement of the sliding member 116.

A connecting portion 124 is attached to the LCD block 40a to control the LCD panel 41a. The connection portion 124 comprises a flexible circuit portion 123 connected to the FCB provided to the fixing plate 50. The flexible circuit portion 123 is bent back upon itself, and is of sufficient length to follow the LCD block 40a along the full sliding range of the LCD block 40a.

The conductive pattern 72 and slider 70 (attached to the slidable LCD block 40a) constitute a mode selection switch, which operates identically to that of the first embodiment. Again, the conductive pattern 72 is connected to a control circuit (not shown), and the control circuit selects the normal mode group when the sliding member 116 and LCD block 40a are slid to the right-most position. When the sliding member 116 and LCD block 40a are slid to the left-most position, the picture mode group is selected, as illustrated in FIG. 11. Subsequent selection of a submode from the chosen mode group is identical to the procedure of the first embodiment.

Thus, in the third embodiment of a mode changeover switch 18b according to the invention, the only exposed moving part is the sliding member 116, and the LCD block 40a moves within the camera body 10. The switch 18b uses fewer parts, and has few exposed moving parts.

Fourth Embodiment

Figure 14:
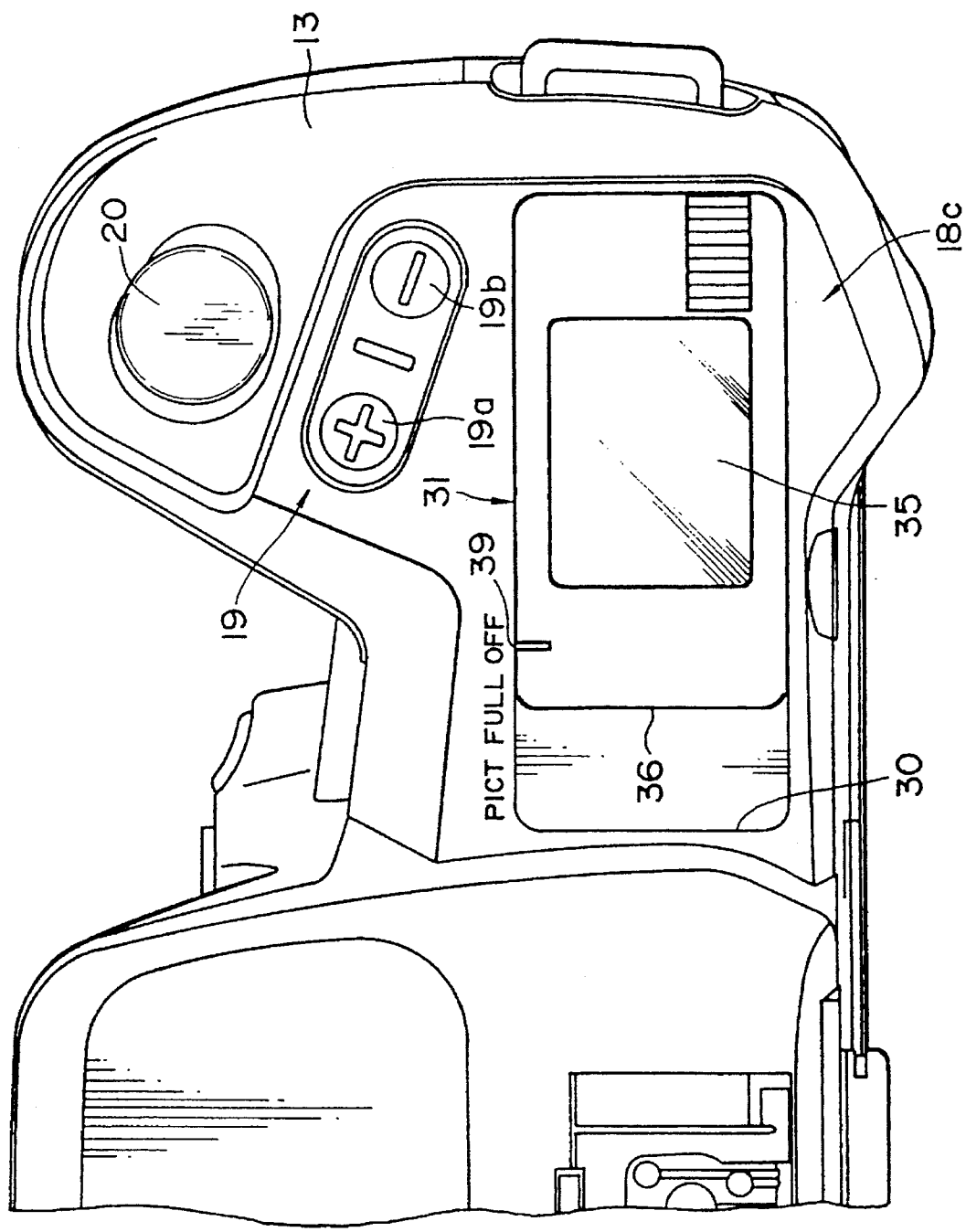
FIG. 14 is a plan view of a fourth embodiment of a mode changeover switch 18c according to the invention.

A fourth embodiment of a mode changeover switch 18c according to the invention is shown in FIG. 14. By sliding a sliding member 31 of the mode changeover device 18c of the fourth embodiment, one of OFF, a normal mode group, or a picture mode group is selected. Furthermore, in response to the movement of sliding member 31, an opaque portion 36 of a sliding member 31 covers and hides the non-selected mode group area of the LCD panel 41.

The elements of the fourth embodiment that are identical to those of the first embodiment are designated by the same reference numerals in FIG. 14, and description of those elements are hereinafter omitted.

As shown in FIG. 14, in the fourth embodiment of a mode changeover device 18c, the sliding member 31 is slidable between three positions. Accordingly, the guide recess 30 is long enough to accommodate the necessary movement range. The transparent portion 35 of the sliding member 31 is identical in size to the first embodiment.

The fourth embodiment of the invention uses substantially the same mechanism for moving the sliding member 31 and the same connection means to the LCD panel 40 as the first embodiment, including the guide pins 32, guide grooves 33, piece block 55, coupling plate 65, and remaining elements. Thus, FIG. 3 is representative of the structure of the fourth embodiment in cross section. However, the length of the guide grooves 33, access groove 33a, guide slot 56, and recess 30 are determined by the range necessary to move the sliding member such that the indication mark 39 may move between "OFF", "PICT", and "FULL" markings on the decorative plate 13.

In the fourth embodiment, the segments 42a through 42i are preferably electrically connected as a single segment and illuminated when the camera is turned ON, staying illuminated as long as the camera 10 is ON. In the alternative, they may be printed in the LCD panel 41 and shown whether the camera 10 is ON or OFF.

The conductive slider 70 (shown in FIG. 3) is identical to that described for the first embodiment, and includes two slider contacts 71 slidably pressed against a predetermined conductive pattern 72 printed on a flexible circuit board (FCB) attached to the fixing plate 50 in the camera 10. The conductive pattern 72 and slider 70 constitute a mode selection switch, which operates identically to that of the first embodiment. Again, the conductive pattern 72 is connected to a control circuit (not shown), and when the sliding member 31 is moved to the right-most position, the control circuit turns the camera 10 OFF, as illustrated in FIG. 14. When the sliding member 31 is slid to the middle position in the guide recess 105, the normal mode group is selected, displaying the always-on segments 42a through 42i and as the appropriate controllable segments (shown in FIG. 7). When the sliding member 31 is slid to the left-most position, the picture mode group is selected, displaying the always-on segments 42a through 42i and the appropriate controllable segments (shown in FIG. 7). Alternatively, the segments 42a through 42i may be printed in the LCD panel 41, and are shown whether the camera 10 is ON or OFF. Subsequent selection of a submode from the chosen mode group is identical to the procedure of the first embodiment.

Thus, using the fourth embodiment of a mode changeover switch 18c according to the present invention, when the photographing mode is selected with the sliding member 31, only the necessary portion of the LCD display 41 is displayed. Non selected portions are covered and hidden, and the mode changeover switch may be further used to turn the camera 10 ON or OFF.

Using the described embodiments of a mode changeover switch 18 through 18c according to the present invention, in response to the selection of the photographing mode with a sliding member, only the necessary portion of the LCD display 41 is displayed, and the portion of the LCD display 41 devoted to the non-selected mode group is covered and hidden. The operator is thus not distracted by extraneous information, and may select from only a narrow group of options. Furthermore, less characters are displayed, making for an easily understandable display. Still further, if the correspondent frames 42a through 42e and characters 45a through 45e, respectively, are each treated electrically as a single LCD segment, then the control is simplified and the LCD panel 41 becomes less complex.

The present disclosure relates to subject matter contained in Japanese Patent Application No. HEI 06-092185, filed on Apr. 28, 1994, which is expressly incorporated herein by reference in its entirety.

What is claimed is:

1. A photographing mode changeover device for a camera having a plurality of photographing modes, said mode changeover device comprising:

means for selecting a photographing mode;

a display device, having a plurality of mode display portions, each of said mode display portions being capable of displaying information corresponding to one of said plurality of photographing modes;

a masking member, having a masking portion and a window portion, said masking portion capable of covering at least one of said plurality of mode display portions while said window portion reveals remaining ones of said plurality of mode display portions;

means for moving said masking member and said display device with respect to each other between a plurality of positions, movement to each of said plurality of positions revealing a previously covered one of said plurality of mode display portions of said display device through said window portion while simultaneously covering another one of said plurality of mode display portions with said masking portion, said means for moving being associated with said selecting means to display information corresponding to a selected one of said photographing modes in said revealed one of a plurality of mode display portions.

2. The mode changeover device according to claim 1, wherein each of said plurality of photographing modes includes a plurality of submodes.

3. The mode changeover device according to claim 2, said camera further comprising means for choosing one of said plurality of submodes.

4. The mode changeover device according to claim 3, wherein information representative of one of said plurality of submodes of a selected photographing mode is displayed when a corresponding one of said plurality of mode display portions is revealed.

5. The mode changeover device according to claim 3, wherein said means for choosing includes a switch for selecting and displaying information representative of said submode chosen by said means for choosing in said revealed portion of said display device.

6. The mode changeover device according to claim 1, wherein said selecting means further comprises a sliding member slidable to select one of said plurality of photographing modes.

7. The mode changeover device according to claim 1, wherein said sliding member is associated with said masking member, and said masking member moves responsive to movement of said sliding member.

8. The mode changeover device according to claim 7, wherein said masking member moves above said display device.

9. The mode changeover device according to claim 8, said camera further comprising a transparent cover, and said masking member is moves between said transparent cover and said display device.

10. The mode changeover device according to claim 6, wherein said masking member is unitarily formed with said sliding member.

11. The mode changeover device according to claim 6, wherein said sliding member is associated with said display device, and said display device moves responsive to movement of said sliding member.

12. The mode changeover device according to claim 11, wherein said display device move below said masking member.

13. The mode changeover device according to claim 1, wherein said selecting means also acts as a power switch, whereby said selecting means can turn said camera ON or OFF.

14. The mode changeover device according to claim 13, wherein said selecting means includes a three position switch, said three position switch being moveable between a first mode position, a second mode position, and an OFF position.

15. The mode changeover device according to claim 1, wherein said moving means includes means for moving said masking member with respect to said display device to reveal selected ones of said plurality of mode display portions of said display device, in response to a selection by said selecting means.

16. The mode changeover device according to claim 1, wherein said moving means includes means for moving said display device with respect to said masking member to reveal selected ones of said plurality of mode display portions of said display device, in response to a selection by said selecting means.

17. The mode changeover device according to claim 1, wherein said window portion is smaller than a total display area of said display device.

18. A photographing mode changeover device for a camera having a plurality of photographing modes, each of said photographing modes having a plurality of submodes, said mode changeover device comprising;

means for selecting one of said plurality of photographing modes;

a display device, having a plurality of mode display portions capable of displaying information corresponding to said plurality of photographing modes;

a masking member capable of covering one of said plurality of mode display portions of said display device while simultaneously revealing another of said plurality of mode display portions;

means for moving said masking member and said display device with respect to each other to reveal one of said plurality of mode display portions of said display device while simultaneously covering another of said plurality of mode display portions, in response to a selection by said selecting means; and means for choosing one of said plurality of submodes, wherein information representative of any of said plurality of submodes of a selected one of said plurality of photographing modes is displaying when a corresponding one of said plurality of mode display portions is revealed.

19. A photographing mode changeover device for a camera having a plurality of photographing modes, said mode changeover device comprising;

means for selecting one of said plurality of photographing modes;

a display device, having a plurality of mode display portions, each of said mode display portions being capable of displaying information corresponding to one of said photographing modes;

a slidable masking member, having a masking portion and a window portion, said masking portion capable of covering one of said plurality of mode display portions while said window portion reveals remaining ones of said plurality of mode display portions; and means for sliding said masking member with respect to said display device, said sliding revealing a previously covered one of said plurality of mode display portions of said display device in said window portion while simultaneously covering another one of said plurality of mode display portions with said masking portion, said sliding means being associated with said selecting means to display information corresponding to said one of said plurality of photographing modes selected by said selecting means in a revealed one of said plurality of mode display portions.

20. A photographing mode changeover device for a camera having a plurality of photographing modes, said mode changeover device comprising:

means for selecting one of said plurality of photographing modes;

a slidable display device, having a plurality of mode display portions, each of said mode display portions capable of displaying information corresponding to one of said plurality of photographing modes;

a masking member, having a masking portion and a window portion, said masking portion capable of covering one of said mode display portions while said window portion reveals remaining ones of said mode display portions; and means for sliding said display device with respect to said masking member, said sliding revealing a previously covered one of said plurality of mode display portions of said display device in said window portion while simultaneously covering another one of said plurality of mode display portions with said masking portion, said sliding means being associated with said selecting means to display information corresponding to a selected one of said plurality of photographing modes in said revealed one of said plurality of mode display portions.

21. A photographing mode changeover device for a camera having a plurality of photographing modes, said mode changeover device comprising:

a display device, having a plurality of mode display portions, each of said mode display portions capable of displaying information corresponding to one of said plurality of photographing modes;

a slidable masking member, having a masking portion and a window portion, said masking portion capable of covering one of said mode display portions of said display device while remaining ones of said mode display portions are visible through said window portion; and means for sliding said masking member with respect to said display device, said sliding revealing a previously covered one of said plurality of mode display portions through said window portion, while simultaneously covering a previously visible one of said plurality of mode display portions with said masking portion, wherein said slidable masking member is capable of selecting one of said plurality of photographing modes by displaying information corresponding to a selected one of said plurality of photographing modes in said revealed one of said plurality of mode display portions.

* * * * *

UNITED STATES PATENT AND TRADEMARK OFFICE
CERTIFICATE OF CORRECTION

PATENT NO. : 5,555,064
DATED : September 10, 1996
INVENTOR(S) : Katsuki MACHIDA

It is certified that error appears in the above-indentified patent and that said Letters Patent is hereby corrected as shown below:

At column 12, line 31 (claim 7, line 1), change "claim 1" to ---claim 6---.

At column 12, line 40 (claim 9, line 3), delete "is".

At column 12, line 50 (claim 12, line 2), change "move" to ---moves---.

Signed and Sealed this

First Day of April, 1997

Attest:

BRUCE LEHMAN

*Attesting Officer*   *Commissioner of Patents and Trademarks*